United States Patent [19]

Koto et al.

[11] 4,421,185
[45] Dec. 20, 1983

[54] COMBINATORIAL WEIGHING SYSTEM

[75] Inventors: Toshio Koto; Katsuhiko Murakami; Yugo Fujitani, all of Shiga, Japan

[73] Assignee: Kabushiki Kaisha Ishida Koki Saisakusho, Kyoto, Japan

[21] Appl. No.: 371,303

[22] PCT Filed: Sep. 2, 1981

[86] PCT No.: PCT/JP81/00213
§ 371 Date: Apr. 13, 1982
§ 102(e) Date: Apr. 13, 1982

[87] PCT Pub. No.: WO82/00883
PCT Pub. Date: Mar. 18, 1982

[30] Foreign Application Priority Data

Sep. 9, 1980 [JP] Japan .................. 55-125700
Sep. 9, 1980 [JP] Japan .................. 55-128961

[51] Int. Cl.³ ............... G01G 19/22; G01G 13/04
[52] U.S. Cl. ........................... 177/25; 177/121
[58] Field of Search ............. 177/1, 25, 119–121; 198/442, 504, 505

[56] References Cited

U.S. PATENT DOCUMENTS

| 2,036,421 | 4/1936 | Luckie | 198/442 X |
| 3,291,233 | 12/1966 | Mayer | 177/120 X |
| 3,355,002 | 11/1967 | Greck | 198/442 |
| 3,939,928 | 2/1976 | Murakami et al. | 177/25 |
| 4,266,691 | 5/1981 | Wolwowicz | 177/121 X |
| 4,308,928 | 1/1982 | Oshima | 177/25 |
| 4,313,507 | 2/1982 | Hays | 177/25 X |

Primary Examiner—George H. Miller, Jr.
Attorney, Agent, or Firm—Armstrong, Nikaido, Marmelstein & Kubovcik

[57] ABSTRACT

A combinatorial weighing system, wherein swing plate 9 disposed substantially in the middle of the interior of a feed hopper 1 uniformly distributes objects of weighing, particularly those liable to tangle each other, in the bottom of the feed hopper without causing localized gathering of the objects, and the objects are then transferred to conveyors 5 disposed close to each other at one of their respective ends and extending in mutually opposite directions until the other ends thereof are positioned outwardly of the lateral walls of the feed hopper, whereby the objects are fed, in amounts within an allowable range of weighing, to the associated automatic weighing machines.

7 Claims, 1 Drawing Figure

U.S. Patent     Dec. 20, 1983     4,421,185
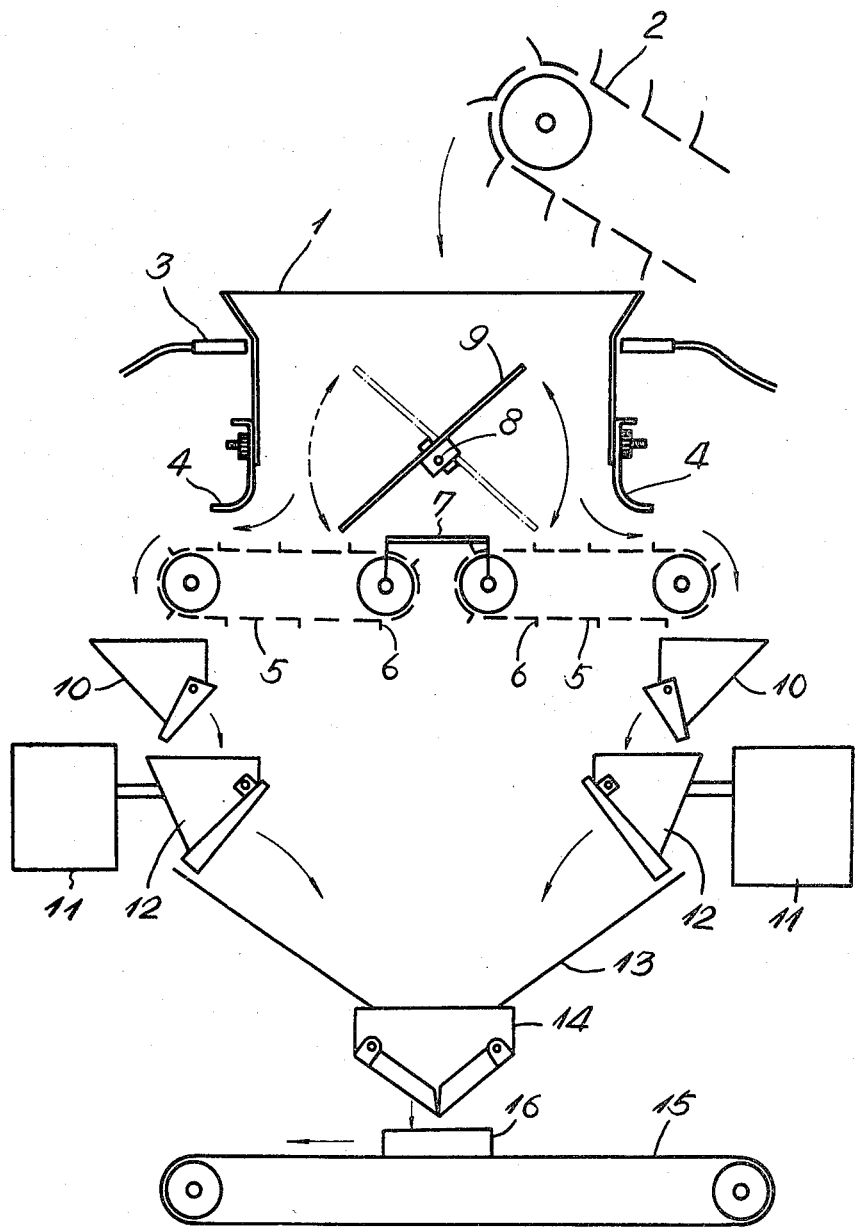

COMBINATORIAL WEIGHING SYSTEM

The present invention relates to a combinatorial weighing system for weighing objects which are liable to tangle each other, and particularly, agricultural products which are liable to tangle each other, hardly slippery, and highly elastic, such as immature green peas.

Generally, in mass weighing and corrective weighing, what is regarded as of utmost importance to increase accuracy of weighing is orderly arrangement of objects and uniformity of the density of flow of objects in a constant quantity take-out device which feeds a weighing hopper with objects of weighing. This is because the weight of objects which are put in for correction after the first stage weighing determines accuracy of weighing. In a conventional weighing machine, in the case of objects whose shape is not fit for orderly arrangement and which differ in size and weight from each other, it has been difficult to take out objects in constant amounts during corrective weighing, with little possibility of obtaining high accuracy. The present applicant has already proposed a combinatorial weighing system which enables the weighing of such objects with high accuracy. If this combinatorial weighing system is composed of ten automatic weighing machines, the amount of objects which can be fed to each automatic weighing machine by the constant quantity take-out device is $\frac{1}{8}$–1/7 of the target combination weight; this allowable range of value, as compared with that for the conventional weighing system, is very wide. Even if these combinatorial weighing systems are used, however, it is difficult to combinatorially weigh with high accuracy a particular agricultural product which is liable to tangle each other, hardly slippery, and highly elastic, such as immature green peas (such agricultural product being hereinafter referred to as immature green peas). This is because, with the conventional constant quantity take-out device using an electromagnetic feeder, even if time control and amplitude control are effected, immature green peas absorb vibration, so that it is difficult to take out immature green peas in constant amounts without deviating from said weight range and feed them to individual automatic weighing machines.

The present invention is intended to solve the above described problem encountered when immature green peas must be fed in constant amounts to the automatic weighing machines of the combinatorial weighing system.

To this end, the invention provides a combinatorial weighing system, comprising a plurality of weighing mechanisms each comprising a feed hopper, a swing plate installed substantially in the middle of said hopper and adapted to swing in a vertical plane, opposed conveyors dispposed with their adjoining ends positioned below substantially the middle of the bottom of the feed hopper and with their delivery ends positioned outwardly of the lower ends of the lateral walls of said feed hopper, and automatic weighing machines opposed to each other and positioned below the delivery ends of the conveyors, wherein combinations of the weight values of objects weighed by the automatic weighing machines included in the individual weighing mechanisms are computed to provide a combination of weight values which is equal or the nearest to a predetermined weight.

According to the invention, objects of weighing are distributed in the bottom of the feed hopper with a uniform density without localized gathering by the vertical swing movement of the swing plate, and then taken out of the feed hopper within an allowable weight range by each conveyor into the associated automatic weighing machine. Thus, objects of weighing which are liable to tangle each other, hardly slippery, and highly elastic, such as immature green peas, can be combinatorially weighed continuously and with high accuracy.

According to an embodiment of the invention, a combinatorial weighing system composed of a number of weighing machines arranged in two opposed rows comprises weighing mechanisms each comprising a swing plate which is attached substantially centrally to the lateral walls of a feed hopper associated with opposed automatic weighing machines and which is adapted to vertically swing through about 45° on each side of the horizontal for a predetermined time, and opposed conveyors which are disposed with their adjoining ends positioned below substantially the middle of the bottom of the feed hopper and with their delivery ends positioned outwardly of the lower ends of the lateral walls of the feed hopper and which are adapted to travel at a constant speed in mutually opposite directions for a predetermined time and provided on their transport surfaces with guide projections for guiding objects of weighing, wherein in response to discharge signals from the weighing hoppers of automatic weighing machines selected as a result of computations of combinations of weights, the vertical swing movement of the swing plate and the traveling movement of the conveyors are successively effected to feed objects to the weighing hoppers for the selected weighing machines.

Thus, a particular agricultural product which is hardly slippery, liable to tangle each other, and highly elastic, such as immature green peas, in the feed hopper can be distributed in the bottom of the feed hopper with uniform density without localized gathering, in such a manner that on the side where the swing plate lowers, the objects are somewhat urged against the transfer surface of the conveyor by being pressed down by the swing plate, and on the side where the latter rises, the entangled objects are separated by the swing plate. Since this distributed state is established by effecting the vertical swing movement of the swing plate for a predetermined time subsequent to the sending of a discharge signal from a weighing hopper, greater uniformity can be achieved. Further, unlike the conventional constant delivery device, since the urging force of the swing plate will never be directed toward the lateral walls of the feed hopper, there is no possibility of pressing objects of weighing against the lateral walls of the feed hopper; therefore, there is no possibility of objects being damaged by the outlet gate as they would otherwise gather into a mass during transfer; nor is there a possibility of their tangling each other after they have left the outlet gate. Further, uniformly distributed objects are placed on the conveyors, and after they have been arranged in predetermined orderliness by the outlet gates of predetermined cross-section while being prevented from slipping by the guide projections, they are transferred to pool hoppers or directly to weighing hoppers, such transfer being effected for a predetermined time subsequent to discharge signals from the weighing hoppers. Thus, it is possible to transfer constant amounts of objects to the weighing hoppers. As a result, objects of weighing can be taken out, in constant amounts, of the feed hoppers and fed, within an allowable weighing range, to the automatic weighing machines of the combinatorial weighing system. The use of the constant quantity take-out device of the invention enables the weight-combinatorial weighing of a particular agricultural product which is hardly slippery, liable to tangle each other, and highly elastic, such as immature green peas, in a continuous manner.

These and other objects and features of the invention will become more apparent from the following description when read with reference to the accompanying drawing.

The drawing schematically shows by way of example a combinatorial weighing system embodying the present invention.

Referring to the drawing, 1 denotes a feed hopper; 2 denotes a feed conveyor for immature green peas, disposed with its delivery end positioned above the upper open end of the feed hopper 1; and 3 denotes level control phototubes attached to the upper portions of the lateral walls of the feed hopper 1 and adapted to control the movement of the feed conveyor 2 to thereby keep constant the amount of immature green peas fed to the hopper 1. Outlet gates 4 made of or coated with low-friction Teflon are installed in opposed relation to transfer conveyors 5 so that the area of openings defined therebetween may be adjusted. The transfer conveyors 5 are disposed with their adjoining ends positioned below substantially in the middle of the bottom of the feed hopper 1 and with their delivery ends positioned outwardly of the outlet gates 4, the transfer conveyors being driven in mutually opposite directions for a predetermined time. The transfer conveyors may, for example, be chain conveyors. Guide projections 6 for immature green peas are fixed on the conveyors 4 at regular intervals. The numeral 7 denotes a plate positioned over the adjoining ends of the conveyors 5 to prevent falling of immature green peas; 8 denotes a pivot shaft attached substantially to the middle portions of the lateral walls of the feed hopper 1; and 9 denotes a swing plate pivotally mounted on the pivot shaft. The swing plate 9 is adapted to swing through about 45° on each side of the horizontal for a predetermined time and mounted in such a manner that the raised position of the end of the swing plate is below the level determined by the level control phototubes 3 and the lowered position thereof is spaced apart from the transfer surfaces of the conveyors 5 to provide a predetermined spacing therebetween. Pool hoppers 10 are opposed to each other and positioned below the delivery ends of the conveyors disposed outwardly of the outlet gates 4, the pool hoppers serving to temporarily store immature green peas in amounts equal to $\frac{1}{3}$-1/7 of the target weight. Automatic weighing machines 11 adapted to receive immature green peas from the pool hoppers 10 and weigh them in cooperation with weighing hoppers 12.

The above described arrangement forms one unit of weighing mechanism, and five such units are arranged in series along a line perpendicular to the plane of the drawing to form a combinatorial weighing system (comprising ten automatic weighing machines). The numeral 13 denotes a collecting chute for collecting immature green peas discharged from the automatic weighing machines of the combinatorial weighing system; 14 denotes a collecting hopper disposed at the bottom of the collecting chute; 15 denotes a belt conveyor; and 16 denotes a collecting box for immature green peas placed on the belt conveyor.

The swing movement of the swing plate 9, the traveling movement of the conveyors 5, and the opening and closing movement of the lids of the pool hoppers are controlled by discharge signals from the weighing hoppers of the weighing mechanism belonging to each unit, i.e., discharge signals from the weighing hoppers of automatic weighing machines corresponding to a selected one of combinations of weights measured by the automatic weighing machines of the combinatorial weighing system, these combinations being computed in an arithmetic circuit. As for the swing plate 9, however, it is swung for a predetermined time set by a timer so that it will not agitate immature green peas to an excessive extent. On the other hand, the opening and closing movement of the lid of the collecting hopper 14 is effected in response to a signal indicating the arrival of the collecting box 16 at a position below the collecting hopper 14.

The operation of the weighing system constructed in the manner described above will now be described. First, immature green peas, which are objects of weighing, are fed to the feed hopper 1 by the feed conveyor 1. This feeding of immature green peas is effected in such a manner as to maintain the level controlled by the level control phototubes 3. Subsequently, the swing plate 9 is caused to swing through about 45° on each side of the horizon. The swing plate 9 operates such that on the side where it is lowered it lightly presses immature green peas against the transfer surface of the conveyor 5 without pressing them against the lateral walls of the feed hopper 1 and on the side where it is raised it separates them without causing them to gather locally, thereby distributing immature green peas in the bottom of the feed hopper 1 with uniform density. This swing movement is effected for a predetermined time subsequent to the sending of a discharge signal from a weighing hopper, so as to prevent immature green peas from being damaged or thickly distributed.

The immature green peas thus uniformly distributed in the bottom of the feed hopper 1 are then placed on the conveyors 5 traveling at a constant speed in mutually opposite directions, the conveyors being driven for a predetermined time. The immature green peas are fed, in constant amounts with orderly arrangement and uniform density, to the pool hoppers 10 through the gates 4 of predetermined cross-section without slippage by the guide projections 6 on the conveyors 5. That is, they are fed in constant amounts equal to $\frac{1}{3}$-1/7 of the target combination weight from the feed hopper to the respective pool hoppers of the automatic weighing machines. They are then put into the weighing hoppers 12 of the automatic weighing machines. Subsequently, the pool hoppers 10, which are now empty, are fed with immature green peas in constant amounts in the manner described above to be ready for the next delivery to the weighing hoppers. The contents of the weighing hoppers are weighed by the respective automatic weighing machines and the weight values are combined in an arithmetic circuit in such a manner as to provide a combination which is equal to or greater than and the nearest to the preset weight value, and the lids of the weighing hoppers 12 of automatic weighing machines corresponding to that combination are opened to discharge the immature green peas.

The discharged immature green peas are collected in the collecting hopper 14 through the collecting chute 13, and then dropped into the collecting box 16 on the belt conveyor 15 by opening the lid of the collecting hopper when the collecting box comes just below the collecting hopper 14. On the other hand, the pool hoppers 10 belonging to the automatic weighing machines 11 which have been selected receive discharge signals from the weighing hoppers 12 and discharge their immature green peas into the weighing hoppers, whereupon the lids of the pool hoppers 10 are closed. Immediately thereafter, the swing plate or plates 9 and conveyors 5 belonging to the pool hoppers 10 are operated in the manner previously described to feed immature green peas in constant amounts to the pool hoppers 10; such operation is repeated many times so that computations of combinations of weights are continuously effected.

While in the illustrated embodiment, the feeding of immature green peas to the feed hopper 1 has been effected by using the level control phototubes 3 and the feed conveyor 2 controlled by the latter, it may be manually effected without using them.

Depending upon the type of objects of weighing, the pool hoppers 10 may be omitted or may be replaced by shutters which will be installed at the delivery ends of the conveyors 5 and which are adapted to be opened and closed in response to discharge signals from the weighing hoppers 12.

Further, while immature green peas selected as a result of computations of combinations of weights have been collected in the collecting hopper 14 through the collecting chute 13 and then received in the collecting box 16 on the belt conveyor 15, it is also possible to discharge them to a packaging machine directly from the collecting hopper 14.

As many apparently widely different embodiments of this invention may be made without departing from the spirit and scope thereof, it is to be understood that the invention is not limited to the specific embodiment thereof except as defined in the appended claims.

We claim:

1. A combinatorial weighing system comprising a plurality of weighing mechanisms each comprising a feed hopper, a swing plate installed substantially in the middle of said hopper and adapted to swing in a vertical plane, at least a pair of conveyors extending in mutually opposite directions with their adjoining ends positioned below substantially the middle of the bottom of said feed hopper and with their delivery ends positioned outwardly of the lower ends of the lateral walls of said feed hopper, and at least a pair of automatic weighing machines opposed to each other and positioned below the delivery ends of said conveyors, wherein combinations of the weight values of objects weighed by the automatic weighing machines included in the individual weighing mechanisms are computed to provide a combination of weight values which is equal or the nearest to a predetermined weight.

2. A combinatorial weighing system as set forth in claim 1, wherein said swing plate is adapted to swing through about 45° on each side of the horizon.

3. A combinatorial weighing system as set forth in claim 1, wherein said swing plate is adapted to swing for a predetermined time.

4. A combinatorial weighing machine as set forth in claim 1, wherein said conveyors are adapted to travel for a predetermined time.

5. A combinatorial weighing system as set forth in claim 1, wherein the transfer surfaces of said conveyors are provided with guide projections for objects of weighing.

6. A combinatorial weighing system as set forth in claim 1, wherein in response to discharge signals from the weighing hoppers of automatic weighing machines selected as a result of computations of combinations of weights, the vertical swing movement of said swing plate and the traveling movement of said conveyors are successively effected so as to feed the objects of weighing to the weighing hoppers of automatic weighing machines selected as a result of said computations of combinations.

7. A combinatorial weighing system comprising a number of automatic weighing machines arranged in two opposed rows, a swing plate attached to substantially the middle portions of the lateral walls of a feed hopper for opposed automatic weighing machines and adapted to swing about 45° on each side of the horizon for a predetermined time, and opposed conveyors which are disposed with their adjoining ends positioned below substantially the middle of the bottom of said feed hopper and with their delivery ends positioned outwardly of the lower ends of the lateral walls of said feed hopper and which are adapted to travel at a constant speed in mutually opposite directions for a predetermined time and are provided on their transfer surfaces with guide projections for objects of weighing, wherein in response to discharge signals from the weighing hoppers of automatic weighing machines selected as a result of computations of combinations of weights, the vertical swing movement of said swing plate and the traveling movement of said conveyors are successively effected so as to feed the objects to the weighing hoppers of said automatic weighing machines selected as a result of said computations.

* * * * *